United States Patent
Majima

(10) Patent No.: US 12,403,658 B2
(45) Date of Patent: Sep. 2, 2025

(54) THREE DIMENSIONAL MOLDING DEVICE

(71) Applicant: SEIKO EPSON CORPORATION, Tokyo (JP)

(72) Inventor: Atsushi Majima, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 18/475,299

(22) Filed: Sep. 27, 2023

(65) Prior Publication Data

US 2024/0109253 A1  Apr. 4, 2024

(30) Foreign Application Priority Data

Sep. 30, 2022  (JP) ................. 2022-157651

(51) Int. Cl.
| | |
|---|---|
| B33Y 30/00 | (2015.01) |
| B29C 64/209 | (2017.01) |
| B29C 64/314 | (2017.01) |
| B33Y 40/00 | (2020.01) |
| B29C 64/118 | (2017.01) |

(52) U.S. Cl.
CPC .......... B29C 64/314 (2017.08); B29C 64/209 (2017.08); B33Y 30/00 (2014.12); B33Y 40/00 (2014.12); *B29C 64/118* (2017.08)

(58) Field of Classification Search
None
See application file for complete search history.

(56) References Cited

U.S. PATENT DOCUMENTS

| | | | |
|---|---|---|---|
| 2016/0347000 A1* | 12/2016 | Kerrigan | B29C 48/288 |
| 2019/0061243 A1 | 2/2019 | Saito et al. | |
| 2020/0001523 A1* | 1/2020 | Anegawa | B33Y 10/00 |
| 2020/0164589 A1* | 5/2020 | Yuwaki | B22F 12/57 |
| 2020/0406531 A1 | 12/2020 | Hashimoto et al. | |

FOREIGN PATENT DOCUMENTS

| | | |
|---|---|---|
| JP | 2021-006375 A | 1/2021 |
| JP | 2022-016532 A | 1/2022 |

* cited by examiner

*Primary Examiner* — Yung-Sheng M Tsui
(74) *Attorney, Agent, or Firm* — WORKMAN NYDEGGER

(57) ABSTRACT

This three dimensional molding device includes a plasticizing section having a screw in which a groove is formed and generating a plasticized material by plasticizing a material by rotating the screw; a nozzle having a nozzle opening and ejecting the plasticized material; an ejection adjustment section provided in a flow path, which communicates with the nozzle opening, and adjusting an ejecting amount of the plasticized material from the nozzle by adjusting an opening area of the flow path; and a control section, wherein the control section controls a rotation speed of the screw at a first rotation speed when the opening area is a first opening area and controls the rotation speed of the screw at a second rotation speed that is faster than the first rotation speed when the opening area is a second opening area that is larger than the first opening area.

6 Claims, 6 Drawing Sheets

THREE DIMENSIONAL MOLDING DEVICE

The present application is based on, and claims priority from JP Application Serial Number 2022-157651, filed Sep. 30, 2022, the disclosure of which is hereby incorporated by reference herein in its entirety.

BACKGROUND

1. Technical Field

The present disclosure relates to a three dimensional molding device and a method for manufacturing a three dimensional molded object.

2. Related Art

JP-A-2022-16532 discloses a three dimensional molding device including a butterfly valve as a flow amount adjustment mechanism for adjusting the ejecting amount of a molten material from a nozzle.

When the ejecting amount is decreased by a flow amount adjustment mechanism such as a butterfly valve, pressure in the flow path upstream of the flow amount adjustment mechanism increases as time elapses. Therefore, when the ejecting amount is increased by the flow amount adjustment mechanism after the ejecting amount is decreased, an unexpected ejecting amount of molten material is ejected from the nozzle due to increased pressure, molding accuracy is affected.

SUMMARY

According to a first aspect of the present disclosure, a three dimensional molding device is provided.

This three dimensional molding device includes a plasticizing section that has a screw in which a groove is formed and that is configured to generate a plasticized material by plasticizing a material by rotating the screw; a nozzle that has a nozzle opening and that is configured to eject the plasticized material; a table on which the plasticized material ejected from the nozzle is deposited; a position changing section configured to change a relative position between the nozzle and the table; an ejection adjustment section that is provided in a flow path, which communicates with the nozzle opening and through which the plasticized material flows, and that is configured to adjust an ejecting amount of the plasticized material from the nozzle by adjusting an opening area of the flow path; and a control section configured to mold a three dimensional molded object in a molding area of the table by controlling the plasticizing section, the position changing section, and the ejection adjustment section, wherein the control section controls a rotation speed of the screw at a first rotation speed when the opening area of the flow path is a first opening area and controls the rotation speed of the screw at a second rotation speed that is faster than the first rotation speed when the opening area of the flow path is a second opening area that is larger than the first opening area.

According to a second aspect of the present disclosure, there is provided a method for manufacturing a three dimensional molded object.

This manufacturing method includes a first step of plasticizing a material by rotating a screw, in which a groove is formed, to generate a plasticized material and a second step of molding a three dimensional molded object by discharging the plasticized material from a nozzle having a nozzle opening, wherein the second step includes a step of adjusting an ejecting amount of the plasticized material from the nozzle by adjusting an opening area of a flow path which communicates with the nozzle opening and through which the plasticized material flows and the first step includes a step of setting the rotation speed of the screw to a first rotation speed when the opening area of the flow path is a first opening area and setting the rotation speed of the screw to a second rotation speed that is higher than the first rotation speed when the opening area of the flow path is second opening area that is larger than the first opening area.

DESCRIPTION OF EMBODIMENTS

A. First Embodiment

Figure 1:
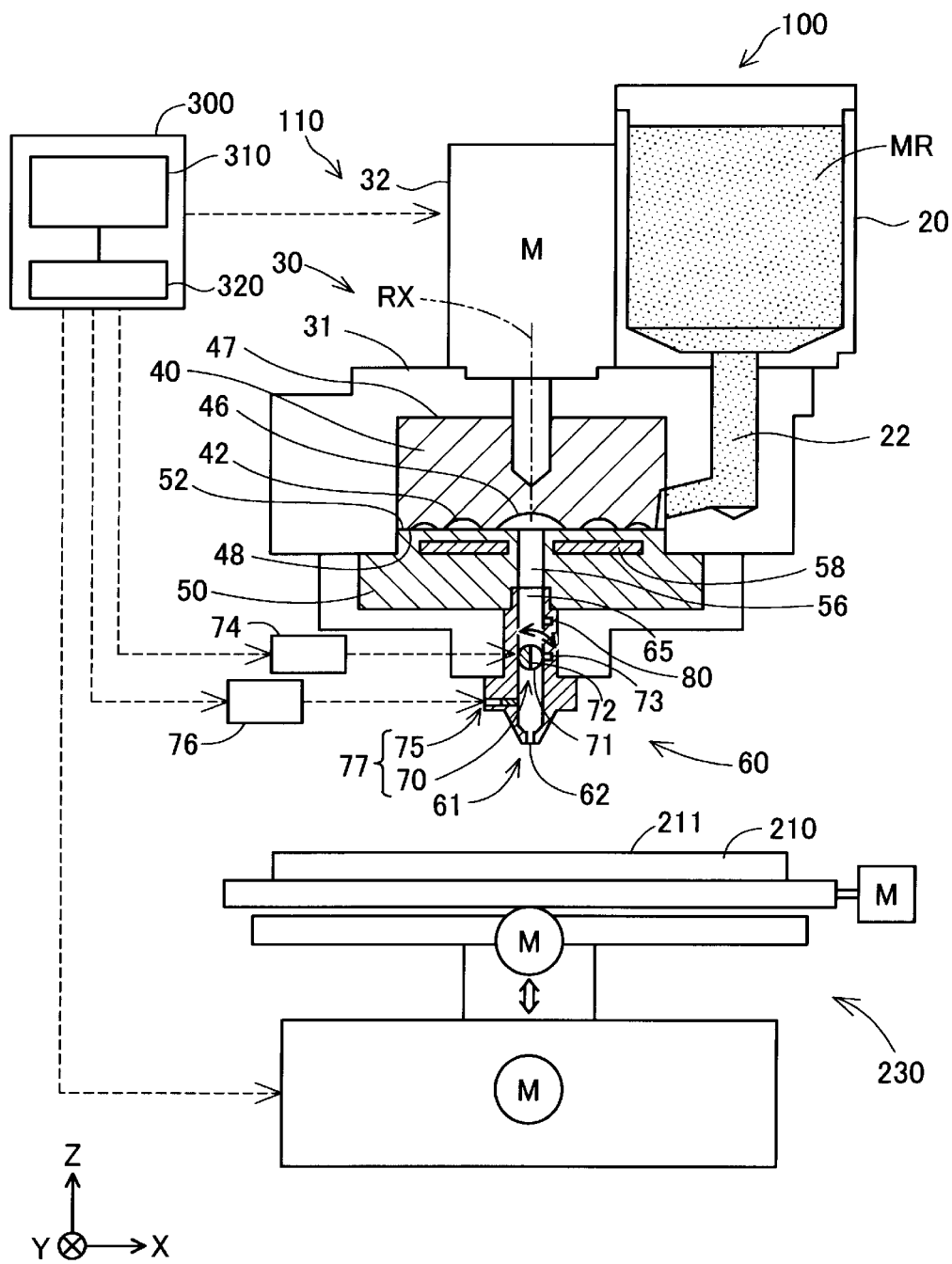
FIG. 1 is an explanatory view showing a schematic configuration of a three dimensional molding device according to a first embodiment.

FIG. 1 is an explanatory view showing a schematic configuration of a three dimensional molding device 100 according to a first embodiment. In FIG. 1, arrows indicating X, Y, and Z directions orthogonal to each other are shown. The X direction and the Y direction are directions parallel to a horizontal plane, and the Z direction is a direction along a vertically upward direction. The arrows indicating the X, Y, and Z directions are appropriately illustrated in other drawings so that the illustrated directions correspond to those in FIG. 1. In the following description, when a direction to be specified, a direction indicated by an arrow in each drawing is referred to as "+" and an opposite direction is referred to as "−", and positive and negative signs are used in combination for direction notation. Hereinafter, the +Z direction is also referred to as "upper", and the −Z direction is also referred to as "lower".

The three dimensional molding device 100 of the present embodiment is a device that molds a molded object by a material extrusion method. The three dimensional molding device 100 includes a molding section 110 that generates and ejects a plasticized material, a table 210 for molding serving as a base of a molded object, a position changing section 230 that controls an eject position of the plasticized material, and a control section 300 that controls each unit of the three dimensional molding device 100.

Under the control of the control section 300, the molding section 110 ejects a plasticized material obtained by plasticizing a material in a solid state onto the table 210. The molding section 110 includes a material supply section 20 that is a supply source of a raw material before being converted into the plasticized material, a plasticizing section 30 that converts the raw material into the plasticized material, and an ejection section 60 that ejects the plasticized material.

The material supply section 20 supplies a raw material MR to the plasticizing section 30. The material supply section 20 is constituted by, for example, a hopper for containing the raw material MR. The material supply section 20 is connected to the plasticizing section 30 via a communication path 22. The raw material MR is supplied to the material supply section 20 in the form of pellets, powder, or the like. As the raw material, for example, a resin material such as ABS (acrylonitrile-butadiene-styrene), PEEK (polyetheretherketone), or PP (polypropylene) is used.

The plasticizing section 30 plasticizes the raw material MR supplied from the material supply section 20 to generate a pasty plasticized material exhibiting fluidity, and guides the plasticized material to the ejection section 60. In the present embodiment, "plasticization" is a concept that includes melting and is a change from a solid to a fluid state. Specifically, in the case of a material that undergoes a glass transition, plasticization means that the temperature of the material is set to be equal to or higher than its glass transition point. In the case of a material that does not undergo glass transition, plasticization means that the temperature of the material is set to be equal to or higher than its melting point.

The plasticizing section 30 includes a screw case 31, a drive motor 32, a flat screw 40, and a barrel 50. The flat screw 40 is also referred to as a rotor or simply a screw. The barrel 50 is also referred to as a screw facing section.

Figure 2:
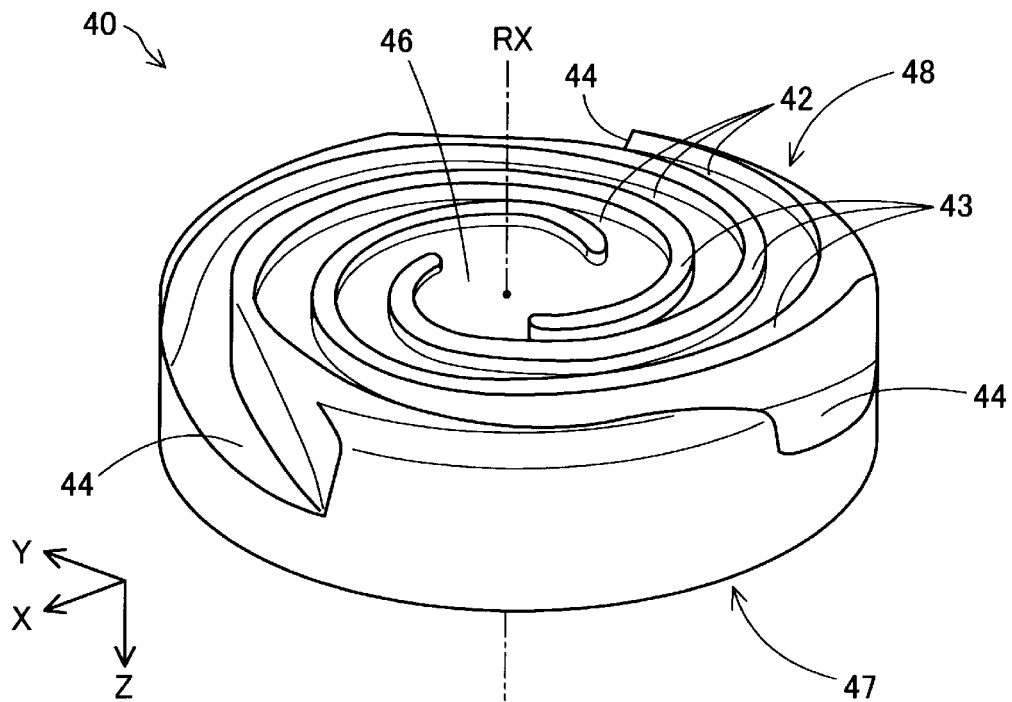
FIG. 2 is a perspective view showing a schematic configuration of a flat screw.
Figure 3:
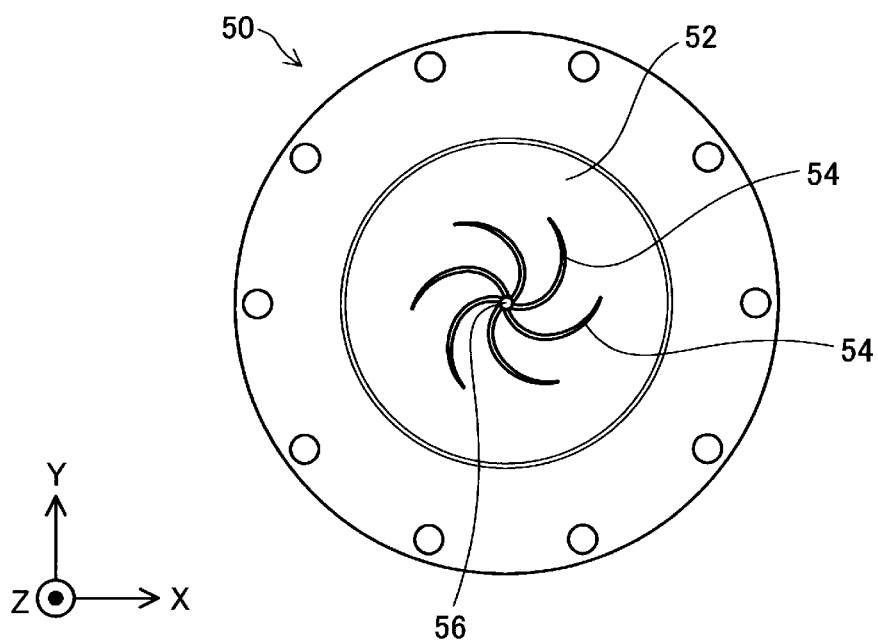
FIG. 3 is a schematic plan view of a barrel.

FIG. 2 is a perspective view showing a schematic configuration of a lower surface 48 side of the flat screw 40. In order to facilitate understanding of the technology, the flat screw 40 shown in FIG. 2 is shown in a state in which the positional relationship between an upper surface 47 and the lower surface 48 shown in FIG. 2 is reversed in the vertical direction. FIG. 3 is a schematic plan view showing the upper surface 52 side of the barrel 50. The flat screw 40 has a substantially columnar shape in which a length in an axial direction, which is a direction along a central axis, is smaller than a length in a direction perpendicular to the axial direction. The flat screw 40 is disposed such that a rotation axis RX, which is its center of rotation, is parallel to the Z direction.

As shown in FIG. 1, the flat screw 40 is housed in the screw case 31. The upper surface 47 of the flat screw 40 is connected to the drive motor 32, and the flat screw 40 is rotated in the screw case 31 by a rotational driving force generated by the drive motor 32. The rotation speed of the flat screw 40 is controlled by the control section 300. The flat screw 40 may be driven by the drive motor 32 via a reduction gear.

As shown in FIG. 2, vortex shaped groove sections 42 are formed on the lower surface 48 of the flat screw 40, which is a surface intersecting the rotation axis RX. The communication path 22 of the material supply section 20 described above communicates with the groove sections 42 from the side surface of the flat screw 40. In the present embodiment, the groove sections 42 are separated from each other by the ridge sections 43, and three groove sections 42 are formed. The number of the groove sections 42 is not limited to three, and may be one or two or more. The groove sections 42 are not limited to a vortex shape, but may be a spiral shape or an involute curve shape, or may be a shape extending so as to draw an arc from the central section toward the outer periphery.

The lower surface 48 of the flat screw 40 faces the upper surface 52 of the barrel 50, and space is formed between the groove sections 42 of the lower surface 48 of the flat screw 40 and the upper surface 52 of the barrel 50. The raw material MR is supplied to the space between the flat screw 40 and the barrel 50 from the material supply section 20 through a material inflow port 44 (shown in FIG. 2).

As shown in FIG. 1, a barrel heater 58 for heating the raw material MR supplied into the groove sections 42 of the rotating flat screw 40 is embedded in the barrel 50. A communication hole 56 is provided at the center of the barrel 50. As shown in FIG. 3, the upper surface 52 of the barrel 50 is formed with a plurality of guide grooves 54 that are connected to the communication hole 56 and that extend vortically from the communication hole 56 toward the outer periphery. One end of the guide grooves 54 may not be connected to the communication hole 56. The guide grooves 54 may be omitted.

The raw material MR supplied into the groove sections 42 of the flat screw 40 flows along the groove sections 42 by the rotation of the flat screw 40 while being plasticized in the groove sections 42, and is guided to a central section 46 of the flat screw 40 as a plasticized material. The plasticized material in a paste state exhibiting fluidity and which flowed into the central section 46 is supplied to the ejection section 60 via the communication hole 56 provided at the center of the barrel 50. In the plasticized material, not all types of substances constituting the plasticized material need be plasticized. The plasticized material may be converted into a state having fluidity as a whole by plasticizing at least some types of substances among the substances constituting the plasticized material.

The ejection section 60 of FIG. 1 includes a nozzle 61 that ejects the plasticized material from a nozzle opening 62, a flow path 65 of the plasticized material provided between the flat screw 40 and the nozzle opening 62, and an ejection control section 77 that controls ejection of the plasticized material.

The nozzle 61 is connected to the communication hole 56 of the barrel 50 through the flow path 65. The nozzle 61 ejects the plasticized material generated in the plasticizing section 30 toward the table 210 from the nozzle opening 62 at the tip end.

The ejection control section 77 includes an ejection adjustment section 70 that opens and closes the flow path 65 and a suction section 75 that sucks and temporarily stores the plasticized material.

The ejection adjustment section 70 is provided in the flow path 65 which communicates with the nozzle opening 62 and through which the plasticized material flows. The ejection adjustment section 70 adjusts the ejecting amount of the plasticized material from the nozzle 61 by adjusting the opening area of the flow path 65. The communication hole 56 formed in the barrel 50 is a part of the flow path 65.

The ejection adjustment section 70 includes a drive shaft 71, a butterfly valve 72, an angle detection sensor 73, and a first drive section 74.

Figure 4:
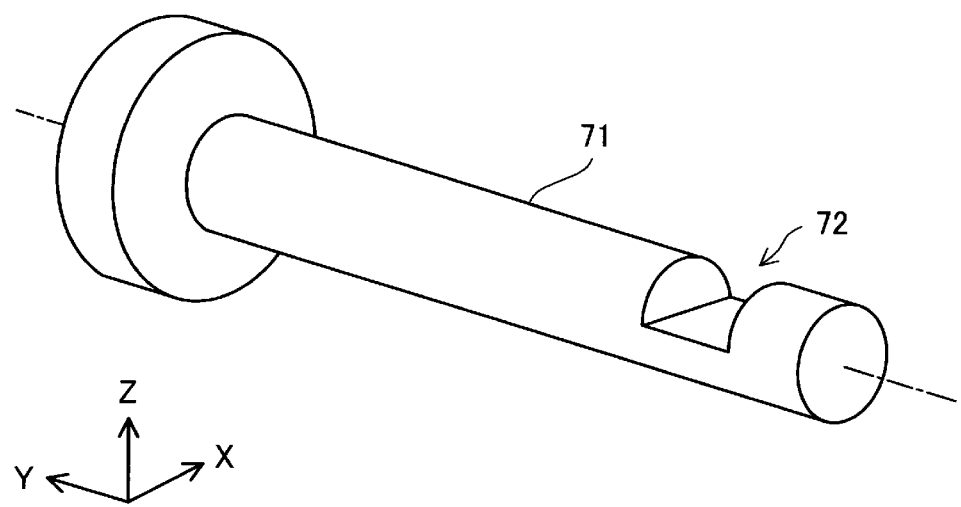
FIG. 4 is a perspective view showing a schematic configuration of a butterfly valve.

FIG. 4 is a perspective view showing a schematic configuration of the butterfly valve 72. The drive shaft 71 is a shaft disposed along a direction intersecting the direction in which the flow path 65 extends. In the present embodiment, the flow path 65 extends along the Z direction, and the drive shaft 71 is disposed along the Y direction. The butterfly valve 72 is formed on a part of the drive shaft 71 in the flow path 65. The butterfly valve 72 is a member obtained by processing a part of the drive shaft 71. The butterfly valve 72 is rotatably disposed in the flow path 65. The drive shaft 71 is provided so that the butterfly valve 72 is located at a position where the drive shaft 71 and the flow path 65 intersect with each other. The rotation angle of the butterfly valve 72 shown in FIG. 4 is an angle at which the opening area of the flow path 65 is zero. The shape of the butterfly valve 72 is not limited as long as it rotates in the flow path 65 to adjust the opening area of the flow path 65, and may be, for example, a plate shape or a hemispherical shape. The butterfly valve 72 is also referred to as a valve.

The angle detection sensor 73 shown in FIG. 1 is a sensor for detecting the rotation angle of the butterfly valve 72. As the angle detection sensor 73, for example, a rotary encoder or a resolver can be used.

The first drive section 74 rotates the butterfly valve 72 by rotating the drive shaft 71. The first drive section 74 is configured by, for example, a stepping motor. The control section 300 adjusts the opening area of the flow path 65 by controlling the rotation angle of the butterfly valve 72 using the first drive section 74, and adjusts the flow amount of the plasticized material flowing from the plasticizing section 30 to the nozzle 61, that is, the ejecting amount of the plasticized material ejected from the nozzle 61. The control section 300 executes feedback control of the rotation angle of the butterfly valve 72 using the detection value of the angle detection sensor 73. The ejection adjustment section 70 can adjust the ejecting amount of the plasticized material and can control ON/OFF of the outflow of the plasticized material.

In the adjustment of the opening area of the flow path 65 using the ejection adjustment section 70, the control section 300 can execute either a process of changing the opening area at a first adjustment speed or a process of changing the opening area at a second adjustment speed that is higher than the first adjustment speed. That is, the control section 300 can adjust the opening area of the flow path 65 at least two stages of adjustment speeds. In the present embodiment, the process of changing the opening area is a process of driving the drive shaft 71 to rotate the butterfly valve 72, and the adjustment speed is the rotation speed of the butterfly valve 72.

The suction section 75 is connected between the ejection adjustment section 70 and the nozzle opening 62 in the flow path 65. The suction section 75 temporarily sucks the plasticized material in the flow path 65 when ejection of the plasticized material from the nozzle 61 is stopped, thereby suppressing a tailing phenomenon in which the plasticized material drips threadlike from the nozzle opening 62. In the present embodiment, the suction section 75 is constituted by a plunger. The suction section 75 is driven by the second drive section 76 under the control of the control section 300. The second drive section 76 is configured by, for example, a stepping motor, a rack and pinion mechanism that converts rotational force of the stepping motor into translational motion of a plunger, or the like.

A pressure sensor 80 is provided in the flow path 65. The pressure sensor 80 is provided in the flow path 65 upstream of the ejection adjustment section 70. The pressure sensor 80 detects the pressure in the flow path 65 upstream of the ejection adjustment section 70.

The table 210 is disposed at a position facing the nozzle opening 62 of the nozzle 61. In the first embodiment, the molding surface 211 of the table 210 facing the nozzle opening 62 of the nozzle 61 is disposed to be parallel to the X and Y directions, that is, a horizontal direction. The table 210 may be provided with a heater for suppressing rapid cooling of the plasticized material ejected onto the table 210.

The position changing section 230 changes the relative position between the table 210 and the nozzle 61 under the control of the control section 300. In the present embodiment, the position of the nozzle 61 is fixed, and the position changing section 230 moves the table 210. The position changing section 230 is configured by a three axis positioner that moves the table 210 in three axial directions of X, Y, and Z directions by driving forces of three motors. In the present specification, unless otherwise specified, the movement of the nozzle 61 means that the nozzle 61 or the ejection section 60 is moved relative to the table 210.

In another embodiment, instead of the configuration in which the table 210 is moved by the position changing section 230, a configuration may be employed in which the position changing section 230 moves the nozzle 61 with respect to the table 210 in a state in which the position of the table 210 is fixed. In addition, a configuration may be employed in which the table 210 is moved in the Z direction by the position changing section 230 and the nozzle 61 is moved in the X and Y directions, or a configuration in which the table 210 is moved in the X and Y directions by the position changing section 230 and the nozzle 61 is moved in the Z direction. Even in these configurations, the relative positional relationship between the nozzle 61 and the table 210 can be changed.

The control section 300 is configured by a computer that has one or a plurality of processors 310, a storage section 320 that includes a main storage section and an auxiliary storage device, and an input/output interface that inputs and outputs signals to and from the outside. By executing a program stored in the storage section 320, the processor 310 controls the plasticizing section 30, the position changing section 230, and the ejection control section 77 according to molding data stored in the storage section 320, thereby molding the three dimensional molded object in the molding region of the table 210. The molding data for molding the three dimensional molded object includes, for each layer of the molded object shaped sliced into a plurality of layers, path information representing a movement path of the nozzle 61 and ejecting amount information indicating the ejecting amount of the plasticized material in each movement path. The movement path of the nozzle 61 is a path in which the nozzle 61 relatively moves along the molding surface 211 of the table 210 while ejecting the plasticized material. The control section 300 may be realized by a configuration in which circuits are combined, instead of being configured by a computer.

Figure 5:
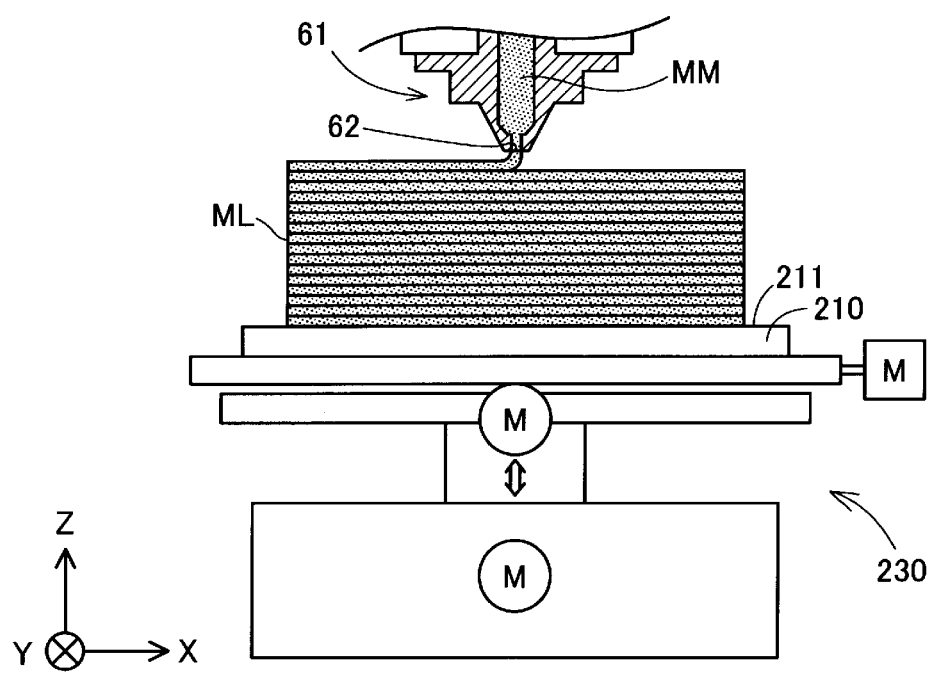
FIG. 5 is an explanatory view schematically showing a basic operation in which the three dimensional molding device molds a molded object.

FIG. 5 is an explanatory view schematically showing a basic operation in which the three dimensional molding device 100 molds the molded object. In the three dimensional molding device 100, as described above, the raw material MR in a solid state is plasticized to generate the plasticized material MM. The control section 300 causes the nozzle 61 to eject plasticized material MM while changing the position of the nozzle 61 with respect to the table 210 in a direction along the molding surface 211 of the table 210 while maintaining the distance between the molding surface 211 of the table 210 and the nozzle 61. The plasticized material MM ejected from the nozzle 61 is continuously deposited in the moving direction of the nozzle 61.

The control section 300 repeats the movement of the nozzle 61 to form a molded layer ML. After forming one molded layer ML, the control section 300 relatively moves the position of the nozzle 61 with respect to the table 210 in the Z direction. Then, the molded object is formed by stacking further molded layers ML on the molded layers ML formed so far.

For example, in a case where the nozzle 61 is to be moved in the Z direction when one layer worth of the molded layers ML is completed, or in a case where there are a plurality of independent molding regions in each molded layer, in some case, the control section 300 temporarily stops ejection of the plasticized material from the nozzle 61. In this case, the flow path 65 is closed by the ejection adjustment section 70 to stop ejection of the plasticized material MM from the nozzle opening 62, and the plasticized material in the nozzle 61 is temporarily sucked by the suction section 75. After changing the position of the nozzle 61, the control section 300 causes the ejection adjustment section 70 to open the flow path 65 while ejecting the plasticized material in the suction section 75, thereby resuming the deposition of the plasticized material MM from the changed position of the nozzle 61.

Figure 6:
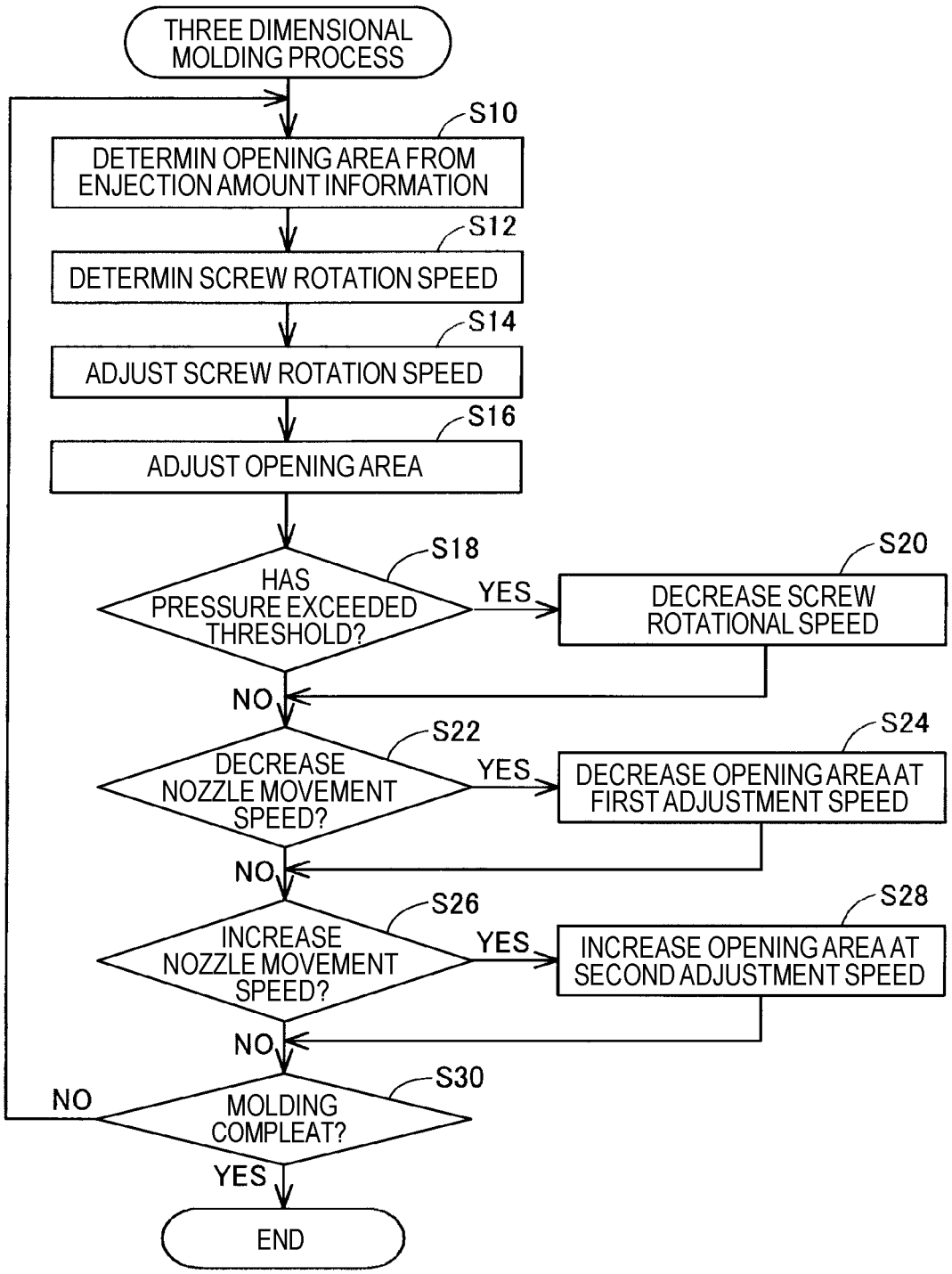
FIG. 6 is a flowchart of a three dimensional molding process in the first embodiment.

FIG. 6 is a flowchart of a three dimensional molding process executed by the control section 300. A method of manufacturing the three dimensional molded object is realized by executing the three dimensional molding process. While the three dimensional molding process is being executed, the control section 300 controls the plasticizing section 30, the position changing section 230, and the ejection adjustment section 70 in accordance with the molding data, thereby depositing the plasticized material on the table 210 and molding the three dimensional molded object.

In step S10, the control section 300 determines the opening area of the flow path 65 based on the ejecting amount information in the molding data. Specifically, the larger the ejecting amount, the larger the value that the control section 300 sets the opening area of the flow path 65 and the smaller the ejecting amount, the smaller the value that the control section 300 sets the opening area of the flow path 65.

In step S12, the control section 300 determines the rotation speed of the flat screw 40 based on the opening area determined in step S10.

Figure 7:
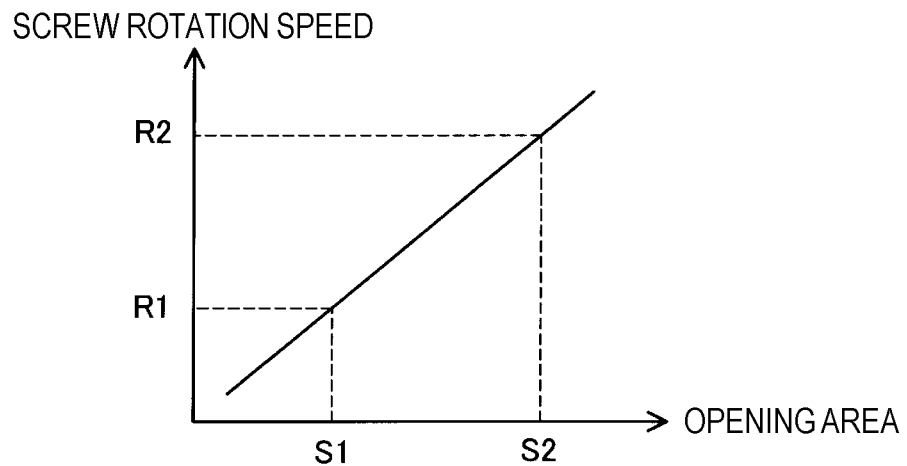
FIG. 7 is a graph showing the relationship between an opening area and a rotation speed of the flat screw.

FIG. 7 is a graph showing the relationship between the opening area of the flow path 65 and the rotation speed of the flat screw 40. As shown in FIG. 7, the larger the opening area of the flow path 65, the more the control section 300 increases the rotation speed of the flat screw 40. For example, when the opening area of the flow path 65 is a second opening area S2, which is larger than a first opening area S1, the control section 300 determines the rotation speed of the screw case 31 is to be a second rotation speed R2, which is faster than a first rotation speed R1. The relationship between the opening area of the flow path 65 and the rotation speed of the flat screw 40 is determined in advance through experiments and simulations so that the amount of the plasticized material supplied to the ejection adjustment section 70 and the amount of the plasticized material flowing out from the ejection adjustment section 70 do not become excessive or deficient when the opening area of the flow path 65 is changed by the ejection adjustment section 70.

In step S14 of FIG. 6, the control section 300 controls the plasticizing section 30 to adjust the rotation speed of the flat screw 40 to the rotation speed determined in step S12.

After the adjustment of the rotation speed of the flat screw 40, then in step S16, the control section 300 controls the ejection adjustment section 70 to adjust the opening area of the flow path 65 to the opening area determined in step S10.

Figure 8:
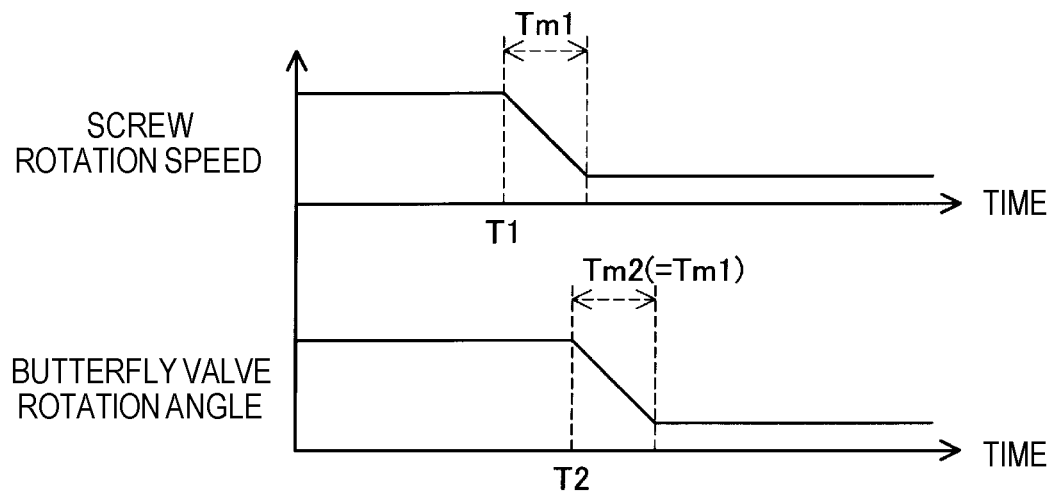
FIG. 8 is a timing chart showing control timings of the flat screw and the butterfly valve.

FIG. 8 is a timing chart showing control timings of the flat screw 40 and the butterfly valve 72. According to the above described step S14 and step S16, in the present embodiment the control section 300 starts an operation for changing the rotation speed of the flat screw 40 earlier than an operation for changing the opening area of the flow path 65. In the timing chart shown in FIG. 8, the control section 300 starts the operation for changing the rotation speed of the flat screw 40 at timing T1, and starts the operation for changing the rotation angle of the butterfly valve 72 at timing T2, which is later than timing T1. The difference between the timing T1 at which the rotation speed of the flat screw 40 is changed and the timing T2 at which the opening area of the flow path 65 is subsequently changed is desirably set by executing experiments or simulations in advance to be a timing at which the plasticized material, in a generation amount that was increased or decreased by changing the rotation speed of the flat screw 40, passes through the flow path 65 and reaches the butterfly valve 72 when the rotation angle of the butterfly valve 72 is changed.

It is desirable that the change of the rotation speed of the flat screw 40 in step S14 and the change of the opening area of the flow path 65 in step S16 are executed so that the times required for the changes coincide with each other. In FIG. 8, the time Tm1 required for changing the rotation speed of the flat screw 40 and the time Tm2 required for changing the angle of the butterfly valve 72 coincide with each other. Thus, when the angle of the butterfly valve 72 is changed, excess or deficiency of the plasticized material supplied to the butterfly valve 72 can be suppressed.

In step S18 of FIG. 6, the control section 300 judges whether the pressure in the flow path 65 measured by the pressure sensor 80 exceeds a predetermined threshold. When it is determined that the pressure exceeds the predetermined threshold value, then in step S20, the control section 300 decreases the rotation speed of the flat screw 40. Specifically, the control section 300 stops the rotation of the flat screw 40 until the pressure measured by the pressure sensor 80 falls below the threshold described above. In this way, "reducing the rotation speed" includes stopping the rotation. When it is judged in step S18 that the pressure does not exceed the predetermined threshold, the control section 300 skips the process of step S20. Note that the control section 300 may make the judgement in step S18 by using a mean value of one or more pressure measurement values measured in the past and the pressure measurement value measured this time. In this way, even in a case where a measurement error is included in the measurement value due to the influence of noise or the like, it is possible to appropriately determine whether or not to decrease the rotation speed of the flat screw 40.

In step S22, the control section 300 judges whether or not the movement speed of the nozzle 61 should be decreased. For example, when the nozzle 61 is moved along a bent path, the control section 300 decreases the movement speed of the nozzle 61. When it is judged that the movement speed of the nozzle 61 is to be decreased, then in step S24, the control section 300 sets the rotation speed of the butterfly valve 72 to the first adjustment speed and rotates the butterfly valve 72 at the first adjustment speed, thereby reducing the opening area of the flow path 65 from the second opening area to the first opening area and reducing the ejecting amount of the plasticized material. The process of step S24 is also referred to as a first process. In step S22, when it is not judged that the movement speed of the nozzle 61 is to be decreased, the control section 300 skips the process of step S24.

In step S26, the control section 300 judges whether to increase the movement speed of the nozzle 61. For example, the control section 300 increases the movement speed of the nozzle 61 when the nozzle 61 is moved along a linear path.

When it is judged that the movement speed of the nozzle 61 is to be increased, then in step S28, the control section 300 sets the rotation speed of the butterfly valve 72 to the second adjustment speed, which is higher than the first adjustment speed, and rotates the butterfly valve 72 at the second adjustment speed, thereby increasing the opening area of the flow path 65 from the first opening area to the second opening area and increasing the ejecting amount of the plasticized material. The process of step S28 is also referred to as a second process. In step S26, when it is not judged to increase the movement speed of the nozzle 61, then the control section 300 skips the process of step S28. The judgement of whether or not to change the movement speed of the nozzle 61 in step S22 and step S26 described above may be executed based on, for example, a command or data for changing the movement speed included in the molding data.

In step S30, the control section 300 judges whether or not the molding of the three dimensional molded object is completed. When it is judged that the molding of the three dimensional molded object is completed, then the control section 300 terminates the three dimensional molding process. On the other hand, in a case where it is judged that the molding of the three dimensional molded object is not completed, then the control section 300 returns the process to step S10 and continues the molding of the three dimensional molded object.

In the three dimensional molding device 100 according to the first embodiment described above, as shown in FIG. 7, the rotation speed of the flat screw 40 is controlled at the first rotation speed when the opening area of the flow path 65 is the first opening area, and the rotation speed of the flat screw 40 is controlled at the second rotation speed, which is higher than the first rotation speed, when the opening area of the flow path 65 is the second opening area, which is larger than the first opening area. Therefore, when the ejecting amount of the plasticized material from the nozzle 61 is large, the rotation speed of the flat screw 40 can be increased to increase the generation amount of the plasticized material, and when the ejecting amount of the plasticized material from the nozzle 61 is small, the rotation speed of the flat screw 40 can be decreased to decrease the generation amount of the plasticized material. Therefore, for example, in the three dimensional molding device in which the rotation speed of the flat screw 40 is set to a constant speed, when the opening area of the flow path 65 is decreased, the pressure in the flow path 65 upstream of the ejection adjustment section 70 increases, and when the opening area of the flow path 65 is subsequently increased, there is a possibility that a phenomenon occurs in which an unexpected ejecting amount of plasticized material is ejected from the nozzle 61, but such a phenomenon can be suppressed in the present embodiment. Therefore, the molded object can be molded with high accuracy.

In addition, in the present embodiment, since the ejection adjustment section 70 which adjusts the ejecting amount of the plasticized material from the nozzle 61 includes the butterfly valve 72, and the control section 300 controls the rotation angle of the butterfly valve 72 based on the detection value of the angle detection sensor 73, it is possible to adjust the opening area of the flow path 65 with a simple configuration.

Further, in the present embodiment, when the pressure, which was measured by the pressure sensor 80 detecting the pressure in the flow path 65 upstream of the butterfly valve 72, exceeds a predetermined value, then the rotation speed of the flat screw 40 is decreased. Therefore, it is possible to prevent the pressure in the flow path 65 upstream of the butterfly valve 72 from increasing excessively, and it is possible to more reliably prevent the plasticized material of an unintended ejecting amount from being ejected from the nozzle 61. In addition, by decreasing the rotation speed of the flat screw 40, it is possible to suppress the resin from being modified in the plasticizing section 30.

Further, in the present embodiment, the control section 300 starts the operation for changing the rotation speed of the flat screw 40 earlier than the operation for changing the opening area of the flow path 65. Therefore, when the opening area of the flow path 65 is changed, it is possible to suppress the occurrence of insufficient supply of the plasticized material from the plasticizing section 30 to the ejection adjustment section 70, and it is possible to suppress the occurrence of ejection defects.

In addition, in the present embodiment, in the adjustment of the opening area of the flow path 65 using the ejection adjustment section 70, the control section 300 executes either a process of changing the opening area at a first adjustment speed and a process of changing the opening area at a second adjustment speed faster than the first adjustment speed. Therefore, the control section 300 can adjust the opening area of the flow path 65 in at least two stages of adjustment speeds.

In addition, in the present embodiment, in the adjustment of the opening area, the control section 300 can execute either the first process of changing from the second opening area to the first opening area at the first adjustment speed or the second process of changing from the first opening area to the second opening area at the second adjustment speed. Then, the control section 300 executes the first process in a case where the relative movement speed of the nozzle 61 is to be decreased and executes the second process in a case where the relative movement speed of the nozzle 61 is to be increased. In other words, according to the present embodiment, the opening area of the flow path 65 is decreased when the relative movement speed of the nozzle 61 is to be decreased and the opening area of the flow path 65 is increased when the relative movement speed of the nozzle 61 is to be increased. The adjustment speed of the opening area is made faster when the opening area of the flow path 65 is to be increased than when it is to be decreased. Therefore, when the movement speed of the nozzle 61 is to be increased, it is possible to rapidly increase the ejecting amount of the plasticized material, and it is possible to suppress a line width of the plasticized material from becoming thin in the linear section of the molded object.

B. Second Embodiment

Figure 9:
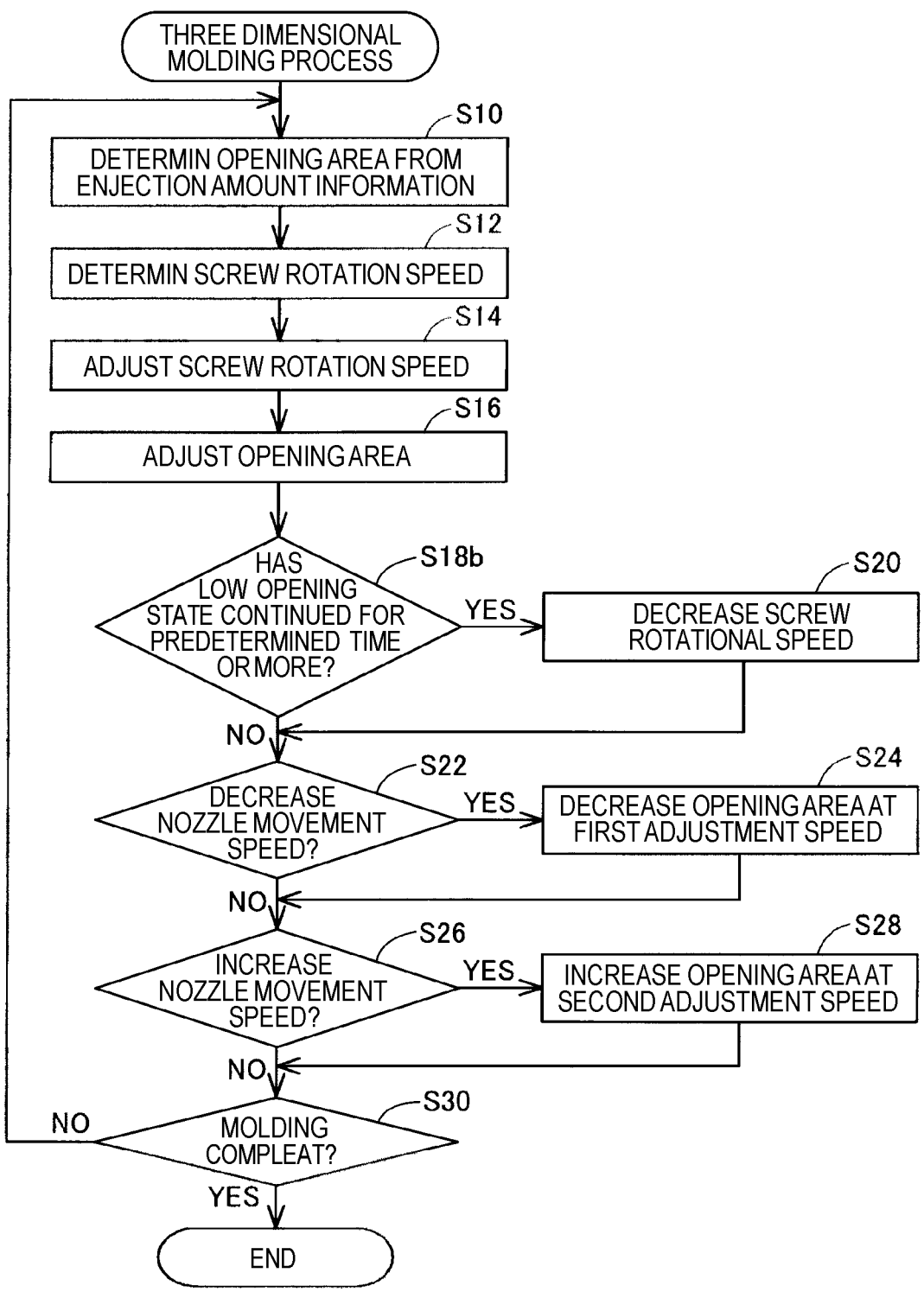
FIG. 9 is a flowchart of the three dimensional molding process according to a second embodiment.

FIG. 9 is a flowchart of the three dimensional molding process according to a second embodiment. In the second embodiment, the process in step S18*b* shown in FIG. 9 is different from the process in step S18 in the first embodiment, and the other processing contents are the same as those in the first embodiment. The configuration of the three dimensional molding device 100 in the second embodiment is the same as that in the first embodiment. However, in the second embodiment, the three dimensional molding device 100 may not include the pressure sensor 80.

As shown in FIG. 9, in the second embodiment, after the process from step S10 to step S16 is finished, in step S18*b*, the control section 300 judges whether or not a state in which the opening area of the flow path 65 is equal to or less than a predetermined value has continued for a predetermined time or more. When it is judged that the state in which the opening area of the flow path 65 is equal to or less than the predetermined value has continued for the predetermined time or more, then in step S20 the control section 300 decreases the rotation speed of the flat screw 40 to decrease the pressure in the flow path 65 upstream of the butterfly valve 72.

According to the second embodiment described above, it is possible to suppress the pressure in the flow path 65 upstream of the butterfly valve 72 from excessively increasing without using the pressure sensor 80. Therefore, similarly to the first embodiment, it is possible to more reliably suppress the plasticized material of an unintended ejecting amount from being ejected from the nozzle 61. By executing experiments or simulations, the above described "predetermined value" and "predetermined time" can be set according to whether or not the pressure in the flow path 65 upstream of the butterfly valve 72 excessively increases when the value and the time are satisfied.

C. Other Embodiments (C1) In the above embodiment, the ejection adjustment section 70 includes the butterfly valve 72. In contrast, the ejection adjustment section 70 may include, for example, a shutter mechanism that adjusts the opening area of the flow path 65 by moving across the flow path 65, or a pin-shaped opening and closing mechanism that is provided in the flow path 65 along the direction in which the flow path 65 extends and that adjusts the opening area of the flow path 65 in the vicinity of the nozzle opening 62 by moving toward the nozzle opening 62.

(C2) In the above embodiment, if there is a certain response delay to the change in the angle of the butterfly valve 72 or the change in the rotation speed of the flat screw 40, a command may be transmitted from the control section 300 to the first drive section 74 or the drive motor 32 at a timing in consideration of the response delay. That is, if the timing at which the angle of the butterfly valve 72 is changed or the timing at which the rotation speed of the flat screw 40 is changed actually corresponds to the timing shown in FIG. 8, the command for changing the angle of the butterfly valve 72 may be transmitted prior to the command for changing the rotation speed of the flat screw 40.

(C3) In the above embodiment, as shown in FIG. 8, the control section 300 starts the operation for changing the rotation speed of the flat screw 40 earlier than the operation for changing the opening area of the flow path 65. In contrast, the control section 300 may start the operation of changing the rotation speed of the flat screw 40 and the operation of changing the opening area of the flow path 65 at the same timing.

(C4) In the above described embodiment, the processes of step S18 and step S20 and the processes of step S22 to step S28 in FIG. 6 or FIG. 9 are optional, and the control section 300 may not execute at least a part of these processes.

(C5) In the above embodiment, the control section 300 can adjust the opening area of the flow path 65 at the adjustment speed in two stages, but the adjustment speed may be fixed, or may be adjustable in three stages or steplessly.

(C6) In the above embodiment, the plasticizing section 30 plasticizes the material by the flat screw 40. In contrast, the plasticizing section 30 may plasticize the material by rotating an in-line screw, for example.

(C7) In the above embodiment, the control section 300 controls the rotation angle of the butterfly valve 72 based on the detection value of the angle detection sensor 73. The control section 300 may control the rotation speed of the flat screw 40 based on the detection value of the angle detection sensor 73. By using the angle detection sensor 73, the opening area of the flow path 65 can be accurately detected based on the detection value of the rotation angle of the butterfly valve 72. Therefore, the rotation speed of the flat screw 40 can be accurately controlled.

D. Other Forms

The present disclosure is not limited to the above described embodiments, and can be realized in various configurations without departing from the spirit thereof. For example, the technical features of the embodiments corresponding to the technical features in each aspect described below can be appropriately replaced or combined in order to solve a part or all of the problems described above or in order to achieve a part or all of the effects described above. In addition, unless the technical features are described as essential in the present specification, the technical features can be appropriately deleted.

(1) According to the first aspect of the present disclosure, the three dimensional molding device is provided.

This three dimensional molding device includes a plasticizing section that has a screw in which a groove is formed and that is configured to generate a plasticized material by plasticizing a material by rotating the screw; a nozzle that has a nozzle opening and that is configured to eject the plasticized material; a table on which the plasticized material ejected from the nozzle is deposited; a position changing section configured to change a relative position between the nozzle and the table; an ejection adjustment section that is provided in a flow path, which communicates with the nozzle opening and through which the plasticized material flows, and that is configured to adjust an ejecting amount of the plasticized material from the nozzle by adjusting an opening area of the flow path; and a control section configured to mold a three dimensional molded object in a molding area of the table by controlling the plasticizing section, the position changing section, and the ejection adjustment section, wherein the control section controls a rotation speed of the screw at a first rotation speed when the opening area of the flow path is a first opening area and controls the rotation speed of the screw at a second rotation speed that is faster than the first rotation speed when the opening area of the flow path is a second opening area that is larger than the first opening area.

According to such an aspect, when the ejecting amount of the plasticized material from the nozzle is large, the rotation speed of the screw can be increased to increase the generation amount of the plasticized material, and when the ejecting amount of the plasticized material from the nozzle is small, the rotation speed of the screw can be decreased to decrease the generation amount of the plasticized material. Therefore, it is possible to suppress ejection of an unexpected ejecting amount of plasticized material from the nozzle due to an increase in the pressure in the flow path on the upstream of the ejection adjustment section. Therefore, the molded object can be molded with high accuracy.

(2) The above aspect may be such that the ejection adjustment section includes a drive shaft disposed along a direction intersecting a direction in which the flow path extends, a valve formed in a portion of the drive shaft, a drive section that rotates the valve by rotating the drive shaft, and an angle detection sensor that detects a rotation angle of the valve, the control section is configured to adjust the opening area by controlling the rotation angle of the valve, and the control section is configured to control the rotation speed based on a detection value of the angle detection sensor.

With such a configuration, the rotation speed of the screw can be accurately controlled.

(3) The above aspect may be such that a pressure sensor configured to detect pressure in the flow path upstream of the ejection adjustment section, wherein the control section is configured to decrease the rotation speed of the screw when a pressure exceeding a predetermined value is detected.

According to such an aspect, it is possible to more reliably suppress ejection of an unintended ejecting amount of plasticized material from the nozzle due to an increase in the pressure upstream of the ejection adjustment section.

(4) The above aspect may be such that the control section is configured to decrease the rotation speed of the screw when the opening area remains at or below a predetermined value for a predetermined time or more.

According to such an aspect, it is possible to more reliably suppress ejection of an unintended ejecting amount of plasticized material from the nozzle due to an increase in the pressure upstream of the ejection adjustment section.

(5) The above aspect may be such that the control section is configured to start an operation for changing the rotation speed of the screw earlier than an operation for changing the opening area of the flow path.

According to such an aspect, it is possible to suppress the occurrence of insufficient supply of the plasticized material when the opening area of the flow path is changed.

(6) The above aspect may be such that the control section is configured to, in adjustment of the opening area, execute either a process of changing the opening area at a first adjustment speed or a process of changing the opening area at a second adjustment speed higher than the first adjustment speed.

According to such a configuration, the opening area of the flow path can be adjusted at the adjustment speed of at least two stages.

(7) The above aspect may be such that the control section is configured to, in adjustment of the opening area, execute either a first process of changing from the second opening area to the first opening area at the first adjustment speed or a second process of changing from the first opening area to the second opening area at the second adjustment speed, and is configured to execute the first process in a case where the relative movement speed of the nozzle is to be decreased and to execute the second process in a case where the relative movement speed of the nozzle is to be increased.

According to such an aspect, when the movement speed of the nozzle is to be increased, the ejecting amount of the plasticized material can be rapidly increased.

(8) According to the second aspect of the present disclosure, there is provided the method for manufacturing the three dimensional molded object. This manufacturing method includes a first step of plasticizing a material by rotating a screw, in which a groove is formed, to generate a plasticized material and a second step of molding a three dimensional molded object by discharging the plasticized material from a nozzle having a nozzle opening, wherein the second step includes a step of adjusting an ejecting amount of the plasticized material from the nozzle by adjusting an opening area of a flow path which communicates with the nozzle opening and through which the plasticized material flows and the first step includes a step of setting the rotation speed of the screw to a first rotation speed when the opening area of the flow path is a first opening area and setting the rotation speed of the screw to a second rotation speed that is higher than the first rotation speed when the opening area of the flow path is second opening area that is larger than the first opening area.

The present disclosure is not limited to the three dimensional molding device and the three dimensional molded object manufacturing method described above, and can be realized by various aspects such as a three dimensional molding system, a computer program, and a non-transitory tangible recording medium in which a computer program is recorded in a computer-readable manner.

What is claimed is:

1. A three dimensional molding device comprising:
    a plasticizing section that has a screw in which a groove is formed and that is configured to generate a plasticized material by plasticizing a material by rotating the screw;
    a nozzle that has a nozzle opening and that is configured to eject the plasticized material;
    a table on which the plasticized material ejected from the nozzle is deposited;
    a position changing section configured to change a relative position between the nozzle and the table;
    an ejection adjustment section that is provided in a flow path, which communicates with the nozzle opening and through which the plasticized material flows, and that is configured to adjust an ejecting amount of the plasticized material from the nozzle by adjusting an opening area of the flow path, wherein the ejection adjustment section includes a drive shaft disposed along a direction intersecting a direction in which the flow path extends, a valve formed in a portion of the drive shaft, a drive section that rotates the valve by rotating the drive shaft, and an angle detection sensor that detects a rotation angle of the valve; and
    a control section configured to mold a three dimensional molded object in a molding area of the table by controlling the plasticizing section, the position changing section, and the ejection adjustment section, wherein
    the control section:
        controls a rotation speed of the screw at a first rotation speed when the opening area of the flow path is a first opening area,
        controls the rotation speed of the screw at a second rotation speed that is faster than the first rotation speed when the opening area of the flow path is a second opening area that is larger than the first opening area,
        is configured to adjust the opening area by controlling the rotation angle of the valve, and
        is configured to control the rotation speed based on a detection value of the angle detection sensor.

2. The three dimensional molding device according to claim 1, further comprising:
    a pressure sensor configured to detect pressure in the flow path upstream of the ejection adjustment section, wherein
    the control section is configured to decrease the rotation speed of the screw when a pressure exceeding a predetermined value is detected.

3. The three dimensional molding device according to claim 1, wherein
    the control section is configured to decrease the rotation speed of the screw when the opening area remains at or below a predetermined value for a predetermined time or more.

4. The three dimensional molding device according to claim 1, wherein
the control section is configured to start an operation for changing the rotation speed of the screw earlier than an operation for changing the opening area of the flow path.

5. The three dimensional molding device according to claim 1, wherein
the control section is configured to, in adjustment of the opening area, execute either a process of changing the opening area at a first adjustment speed or a process of changing the opening area at a second adjustment speed higher than the first adjustment speed.

6. The three dimensional molding device according to claim 5, wherein
the control section is configured to, in adjustment of the opening area, execute either a first process of changing from the second opening area to the first opening area at the first adjustment speed or a second process of changing from the first opening area to the second opening area at the second adjustment speed, and is configured to execute the first process in a case where the relative movement speed of the nozzle is to be decreased and to execute the second process in a case where the relative movement speed of the nozzle is to be increased.

* * * * *